United States Patent [19]

Tabacchi

[11] Patent Number: 4,707,088
[45] Date of Patent: Nov. 17, 1987

[54] LORGNETTE EYEGLASS FRAME

[76] Inventor: Vittorio Tabacchi, Z.I. - VII Strada, n. 20, 35129 Padova, Italy

[21] Appl. No.: 818,131

[22] Filed: Jan. 13, 1986

[51] Int. Cl.⁴ .......................... G02C 3/04; A45C 11/04
[52] U.S. Cl. ............................... 351/56; 248/DIG. 2; 206/5
[58] Field of Search .............................. 351/56, 63, 64; 248/DIG. 2; 206/5 R, 5.1, 6

[56] References Cited

U.S. PATENT DOCUMENTS 1,899,664  2/1933  Blocker ................................ 351/56

Primary Examiner—Rodney B. Bovernick
Assistant Examiner—P. Dzierzynski
Attorney, Agent, or Firm—Howard I. Schuldenfrei

[57] ABSTRACT

A lorgnette eyeglass frame has a lens-bearing frame and a handle of box-shaped conformation. The frame is slideably guided within the handle which constitutes the case for same.

3 Claims, 5 Drawing Figures

LORGNETTE EYEGLASS FRAME

BACKGROUND OF THE INVENTION

The object of the present invention is a frame for lorgnette eyeglasses of the type comprising a lens-bearing frame to which a rigid, bar-shaped handle is connected.

Lorgnettes are the vision-correcting elements generally used, in replacement of the more common eyeglasses, by persons who make only sporadic use of such corrective instruments.

They differ from the traditional eyeglasses which have earpieces by the fact that said earpieces are replaced by a handle which is attached to a single side of the lens-bearing frame.

In view of the purpose of use for which they are intended and which is characterized by only occasional use, and in view of their relatively fragile structure they require a protective case within which to place them when they are not in use.

Typical cases and corresponding lorgnettes are described in British Patent No. 952,747 and in the French Patent published under No. 2,267,562.

Said British patent concerns a lorgnette with foldable lens-bearing frame mounted in a box-shaped case.

The case of said patent is intended to be attached by a strap to the wrist of the user.

The lorgnette is used by raising one's wrist to the height of one's eyes. Obviously, such a position can be maintained only for very short periods of time and is fatiguing.

French Patent No. 2,267,562 proposes a lorgnette having a solid plate-shaped lens-bearing frame and a flexible bag-type case.

The lens holder frame is of a rigid, heavy structure and is without a nosepiece betweeen the lens-holder rims and without a handle.

The sole purpose of the case is to protect the lenses from scratches.

In order to use the lorgnette the user must grasp the lens-holder frame on one side and hold it up to his eyes.

Since this frame lacks a nosepiece and a suitable handle, this operation is fatiguing and difficult. The frame, furthermore, is not effectively protected against blows or bends when it is contained within the case.

SUMMARY OF THE INVENTION

The object of the present invention is to provide a frame for lorgnette eyeglasses which is of such a structure that it overcomes all the difficulties pointed out with respect to the above-indicated prior art and, in particular, is of such a nature as to have a lens-holder frame which is well-protected when the lorgnette is put away and which can be held without fatigue when the lorgnette is in use.

This object has been achieved by the invention by means of an eyeglass frame of the above-mentioned type which is characterized by the fact that the said handle is of a box-like shape and that said frame is slideably guided within it between a first position in which it extends from it and a second position in which it is completely contained within it, said handle constituting the case for said frame when the latter is in said second position.

Still other objects and advantages will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

The characteristics and advantages of the invention will become more clearly evident from the detailed descriptions of a preferred, but not exclusive, embodiment thereof given by way of illustration and not of limitation, by reference to the accompanying drawings, in which.

DETAILED DESCRIPTION OF THE INVENTION

Figure 1:
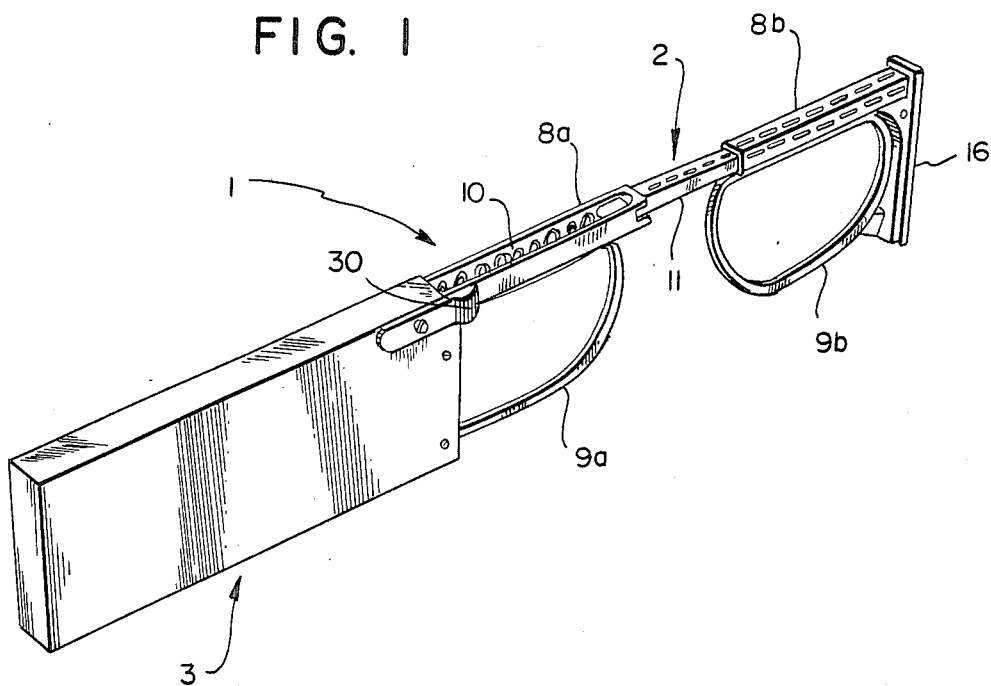
FIG. 1 is a perspective view of a lorgnette according to the invention, shown in position of use.

In the said figures, 1 is generally a lorgnette eyeglass frame having a lens-bearing frame 2 and a rigid bar-shaped handle 3.

The handle 3 has the shape of an elongated parallelepiped box, open at one end.

Within it there are provided two opposing facing projections 5a, 5b which extend longitudinally in the vicinity of and parallel to a wall 3a thereof.

The projections 5a, 5b divide the inside of the handle 3 into two compartments 6 and 7 which are bounded by the wall 3a and by the opposite wall 3b, respectively.

The frame 2 comprises an elongated bar 8 formed of two portions 8a, 8b which are aligned axially in the extension of each other and to each of which there is fastened a corresponding lens-bearing rim 9a, 9b.

The portion 8a is tubular with a square cross-section; in one of its walls a longitudinally elongated hole 10 is provided.

The portion 8b is provided with an axially extending appendage 11 which is inserted telescopically within the portion 8a. On the free end of the appendage 11 there is provided a projection 12 in sliding engagement in the slot 10 which serves as end of slide stop betweeen the two portions 8a, 8b of the bar 8.

A coil spring 13 is arranged within the portion 8a between a pin 14 and the free end of the appendage 11. The spring 13 continuously urges the portions 8a, 8b away from each other.

At the opposite ends of the bar 8 on the portions 8a, 8b there are fastened, at a right angle, an L-shaped bracket 15 and a plate 16 respectively.

The bracket 15 has its long side 15a adjacent the corresponding rim 9a.

The plate 16 is butt-welded to the free end of the portion 8b, which portion is also adjacent the rim 9b.

The plate has a substantially frustoconical back 16a, adapted to form a closing wall for the open end of the handle 3, as will be better explained below.

The plate portion 16 which is adjacent the rim 9 has the shape of a block 16b traversed by a continuous hole 18, the axis of which is perpendicular to the plane of the frame 2.

The hole 18 constitutes the seat for a snap-action closure device 19 for the lorgnette 1.

The device 19 comprises two small balls 20 which are urged by a spring 21 against a corresponding chamfered end edge of said hole 18.

Figure 2:
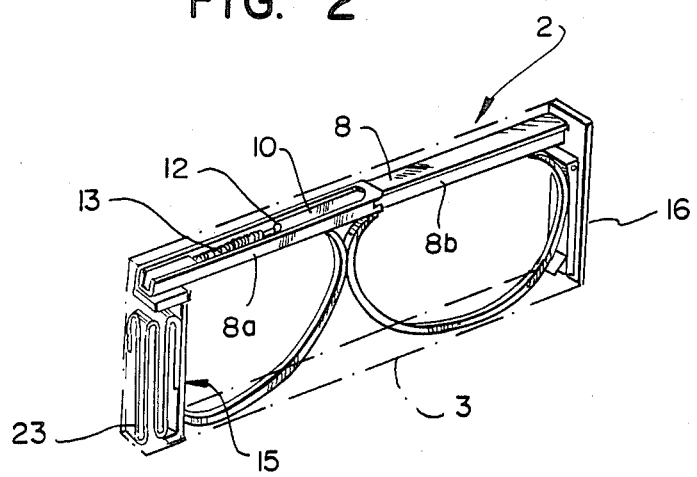
FIG. 2 is a perspective view of the lorgnette of FIG. 1 in position within its case, the latter being indicated by dash-dot lines.
Figure 3:
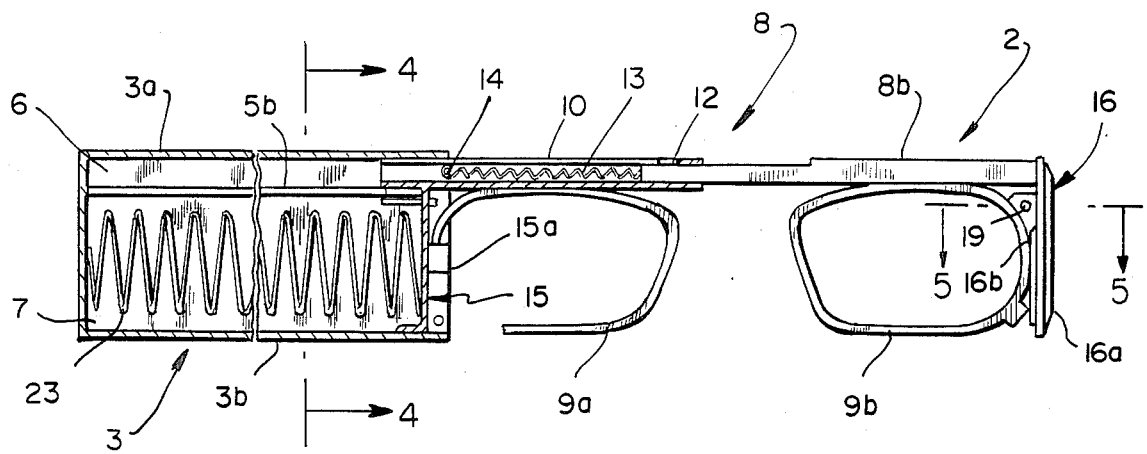
FIG. 3 is a view in longitudinal section through the lorgnette of the preceding figures.
Figure 4:
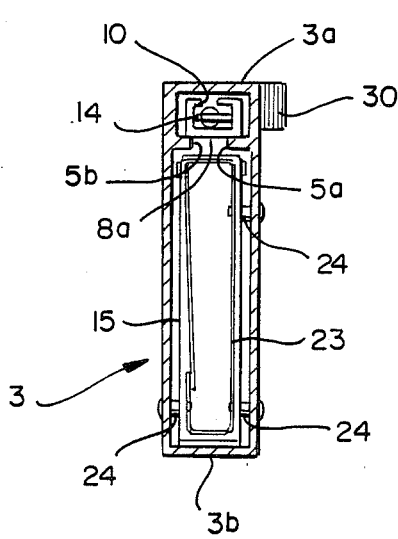
FIGS. 4 and 5 are cross sections along the lines IV—IV and V—V of FIG. 3.
Figure 5:
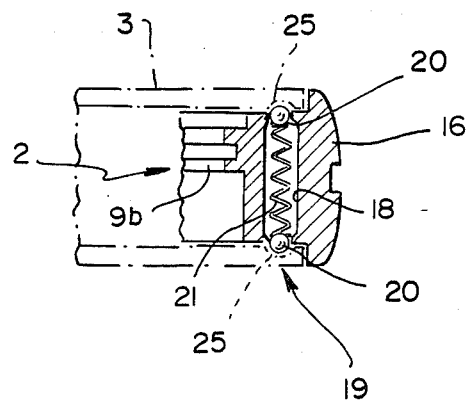

The frame 2 is slideably guided within the handle 3 between a first position in which it extends from it (FIG. 1) and a second position in which it is completely contained within it (FIG. 2). In this second position the handle 3 constitutes the case for the frame 2.

The bar 8 is slideable within the space 6 which constitutes a guide channel for it. In their turn, the rims 9a, 9b are housed within the space 7 when the frame 2 is in its second position.

Within said space 7 there is provided a leaf spring 23 which acts against the bracket 15 so as to urge the frame 2 towards the position in which it extends out of the handle 3. In this first position, the long side 15a of the bracket 15 rests against one of a plurality of pins 24 located in the handle 3 near its open end and protruding into the space 7; the bar 8 is telescopically extended by the spring 13, with the positions 8a, 8b having maximum spacing between each other. The same is true of the rims 9a, 9b which, thus spaced apart, can be placed astride the nose of the user.

When the frame 2 is in the second position, contained within the handle 3, the block 16b is inserted in the mouth of the opening 7. The balls 20 of the snap-action closure device 19 of the lorgnette 1 are engaged in corresponding recesses 25 provided near the open end of the handle 3 on opposite walls of the spaces 7.

Under these conditions, the plate 16 constitutes the closure wall for the open end of the said handle 3.

In order to use the lorgnette 1, it is merely necessary to push the plate 16 slightly away from the handle 3, thereby disengaging the balls 7 from the recesses 25.

In the embodiment shown, there is provided for this purpose a push knob 30 which is slideably connected to the handle 3 near its open end.

When the push knob 30 is advanced towards the plate 16 it comes against the back 16b of the latter, releasing the device 19.

The subsequent extraction of the frame 2 is caused by the spring 13 until the bracket 15 comes against the pins 24.

After one has finished using the lorgnette, the frame 2 is again pushed into the handle 3 until the ball 20 of the device 19 engages in the recesses 25. The appendage 11 of the portion 8b of the bar 8 slides telescopically into the portion 8a, the rims 9a, 9b thus coming together.

The lorgnette of the invention has numerous advantages, including its reduced size when the frame 2 is contained within the handle 3, as well as the great protective effectiveness of the handle 3 as case for the frame 2.

Fatigue on the part of the user of the lorgnette of the invention is furthermore reduced to a minimum due to the ease of grasping the handle 3 and the great slenderness and lightness of the entire structure.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A lorgnette eyeglass frame comprising a lens-holder frame to which there is attached a rigid, bar-shaped handle, characterized by the fact that said handle is of box shape and that said frame is slideably guided within it between a first position in which it extends from it and a second position in which it is completely contained within it, said handle constituting a case for said frame when it is in said second position, and having within it a pair of facing projections extending longitudinally parallel to and close to one of its walls and capable of forming a guide channel for a crossbar of said lens, said crossbar in its turn being formed of two portions, each provided with a corresponding lens-holder rim, said portions being telescopically connected to each other and resiliently urged into the maximum distance apart.

2. An eyeglass frame according to claim 1, characterized by the fact that it has a solid plate at the free end of said arm, constituting a wall of said handle when said frame is in said second position.

3. An eyeglass frame according to claim 2, characterized by the fact that it has a spring which acts between said handle and said frame and urges the latter towards said first position and a snap-closure device on said frame capable of holding it in said second position.

* * * * *